No. 879,281.
PATENTED FEB. 18, 1908.
M. LO CELSO.
MEASURING DEVICE FOR TAILORS' USE.
APPLICATION FILED MAR. 14, 1907.
2 SHEETS—SHEET 1.
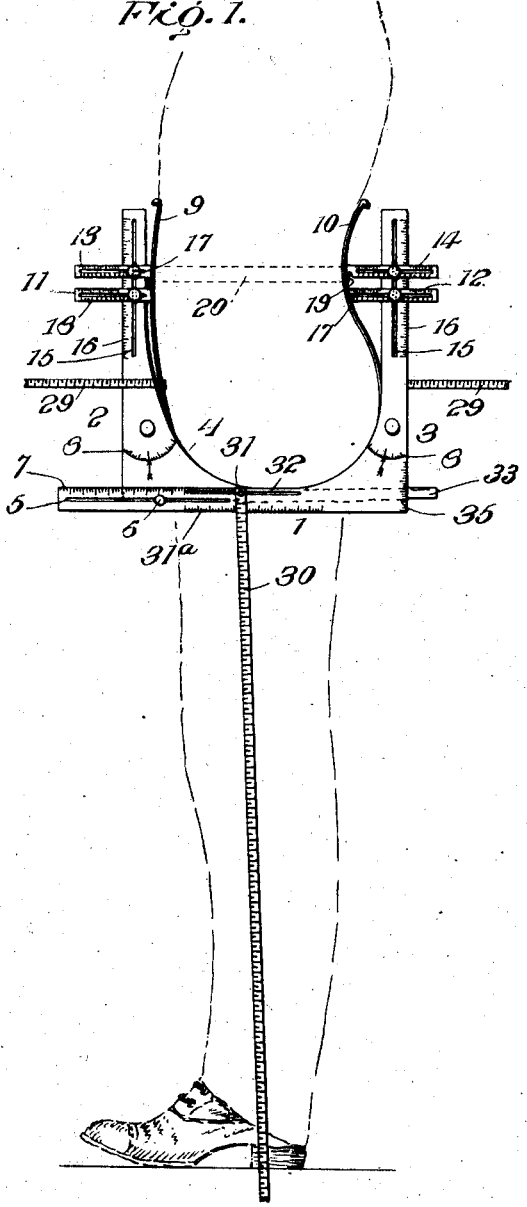
Inventor
Michael Lo Celso, No. 879,281. PATENTED FEB. 18, 1908.
M. LO CELSO.
MEASURING DEVICE FOR TAILORS' USE.
APPLICATION FILED MAR. 14, 1907.
2 SHEETS—SHEET 2.
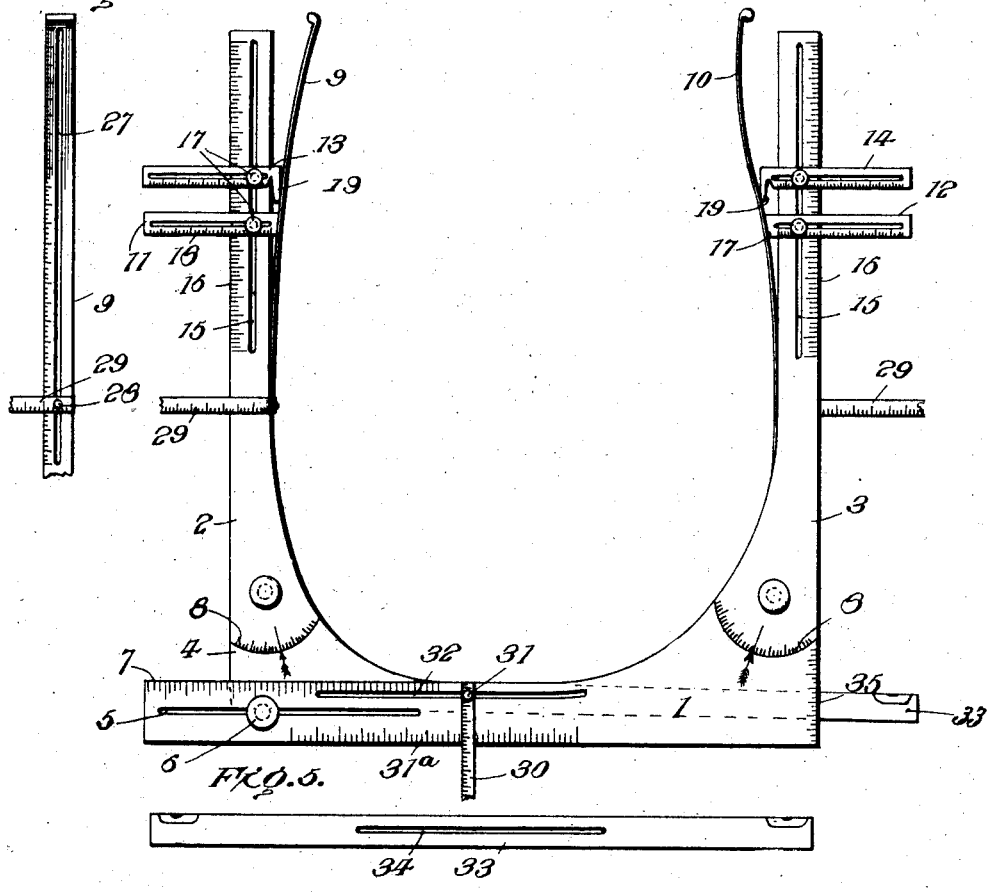
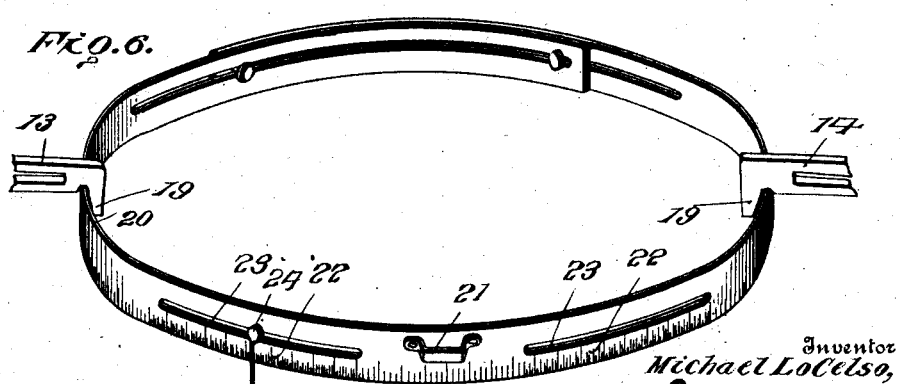

UNITED STATES PATENT OFFICE.

MICHAEL LO CELSO, OF CHICAGO, ILLINOIS.

MEASURING DEVICE FOR TAILORS' USE.

No. 879,281.      Specification of Letters Patent.      Patented Feb. 18, 1908.

Application filed March 14, 1907. Serial No. 362,383.

*To all whom it may concern:*

Be it known that I, MICHAEL LO CELSO, citizen of the United States, residing at Chicago, in the county of Cook and State of Illinois, have invented certain new and useful Improvements in Measure Devices for Tailors' Use, of which the following is a specification.

This invention contemplates certain new and useful improvements in measuring devices for the use of tailors and has particular reference to the measuring of trousers.

The invention has for its object an apparatus by which the tailor may obtain all of the main measurements of a customer for a pair of trousers and which may be used to obtain the measurements very quickly and with a minimum degree of adjustment, the device being designed to be applied to the cloth after it has been set for a customer's measurements so that the cloth may be cut from such measurements directly from the device as a pattern.

The invention consists in certain constructions and arrangements of the parts which I shall hereinafter particularly describe and then point out the novel features in the appended claims.

For a full understanding of the invention and the merits thereof and also to acquire a knowledge of the details of construction of the means for effecting the result, reference is to be had to the following description and accompanying drawings, in which:

Figure 1 is a side elevation of my improved measuring device, showing its application; Fig. 2 is a front elevation thereof; Fig. 3 is a side elevation on an enlarged scale; Fig. 4 is a detail face view of a portion of one of the spring tapes; Fig. 5 is a detail view of the spirit level employed; and, Fig. 6 is a detail perspective view of the waist belt detached.

Corresponding and like parts are referred to in the following description and indicated in all the views of the drawings by the same reference characters.

My improved measuring device comprises a frame embodying a base plate 1 and vertically extending front and rear pivoted beams 2 and 3. The front beam 2 is pivotally mounted on the foot piece 4 which latter is slidingly connected to one end of the base plate 1 so as to slide longitudinally thereof. This sliding connection between the foot 4 of the front beam 2 and the front end of the base plate 1 is effected in the present instance by means of a slot 5 in the plate and a set screw 6 received in said slot and working in the foot 4. The front end of the base plate 1 is provided on its upper edge with a scale 7, so that the extension or position of the foot 4 with respect to the base plate 1, and the consequent distance between the two beams 2 and 3 as a whole may be determined. The rear pivoted beam 3 is mounted directly upon the rear end of the base plate 1 and both of said beams are provided at their curved pivoted edges with scales 8 designed to coact with darts on the foot 4 and rear end of the base plate 1 so as to determine the deviation of said beams from the vertical.

On one of the vertical pivoted beams a spring tape is secured, the front tape being designated 9 and the rear tape 10. These two tapes may be composed of whale-bone or spring steel, or similar resilient substance and are secured at their lower ends to the opposite edges of the beams 2 and 3 near the ends of the latter, the upper ends of said spring tapes being free from connection to the beams and being adapted to be sprung in against the abdomen and small of the back of the person being measured. In order to move these spring tapes inwardly and hold them at their proper positions, I provide two lower adjusting bars 11 and 12, front and rear, and two upper adjusting bars 13 and 14, front and rear. Each one of the pivoted beams 2 and 3 is provided near its upper end with a vertically extending slot 15 and with scales 16 contiguous to said slots and the upper and lower arms 11, 12, 13 and 14, are slidingly held to the beams by set screws 17 working in said slots and in slots formed in the adjusting arms themselves. It will be noted that the said arms are also provided with scales along one edge, as indicated at 18, and that by the connection described, the said arms may be adjusted up and down and towards and farther from each other as desired. The inner ends of the adjusting arms are adapted to bear against spring tapes 9 and 10 to push the said tapes against the body of the person being measured and to conform the spring tapes to the latter. The arms are held in their adjusted position by means of the set screws 17.

The inner end of each upper adjusting arm (13 and 14) is formed with a downwardly facing hook 19 which is adapted to engage and hold a waist belt 20 which is preferably of spring steel. The belt 20 is formed with overlapping ends adjustably held together by means of set screws and slots as shown and at front and back said belt is preferably provided with a loop 21, and the said hooks 19 are designed to be inserted in said loops. In addition to the main scale extending along one edge of the waist belt 20 and designed for the purpose of measuring a person's waist, the said belt is provided with auxiliary scales 22 that are located adjacent longitudinal slots 23. Within each of these slots is a button or stud 24 which is mounted to slide along its respective slot and which has suspended from it a plumb line 25 to the lower end of which a bob or weight 26 is secured. These plumb lines are adapted to extend down in front of the person's legs, so that the proper position for the crease of the trousers may be determined, it being obvious that the line may be moved laterally in one direction or the other by means of the sliding stud 24 in the slot 23.

Each of the spring tapes 9 is provided with a longitudinal slot 27 and a small stud 28 is mounted to slide in each slot. To each stud a tape measure 29 is secured. Another tape measure 30 is mounted on a similar stud 31 fitted to slide within a slot 32 formed in the base plate 1, and the purpose of these three tape measures is for measuring a person's hips and thighs.

A spirit level 33 is longitudinally and pivotally connected to the base plate 1, as illustrated in full and dotted lines in Figs. 1 and 3, the spirit level itself being shown detached in Fig. 5. This spirit level is formed in its middle portion with a slot 34 through which the stud 31 extends, so as to provide for the pivotal and longitudinal adjustment of the spirit level. By this arrangement, no matter whether the customer stands perfectly upright or inclines backwardly or forwardly, the true level of the garment may be shown by the spirit level 33 in combination with the scale 35 at the rear end of the base plate 1.

In practical use my improved measuring device is thrust upwardly between the legs of the person to be measured for the trousers until a snug fit of the apparatus is secured, the foot 4 being slid outwardly or inwardly as necessary and the beams 2 and 3 being adjusted to the proper positions. The spring tape measures 9 and 10 are pressed inwardly as above described and held in their proper adjusted positions, and the waist belt is fitted to the hooks 19 and the waist measurement of a person obtained while at the same time the plumb lines are manipulated to obtain the proper position of the creases of the trousers' legs, and the tape measures 29 and 30 are passed over the person's hips and around the upper portions of the thighs so that by this means all of the necessary measurements may be obtained. The tape measure 30 may also be used in a vertical position, so as to indicate the length of the inside seam of the trouser's legs, and in this connection it may coact with the scale 31 on the lower edge of the base plate 1. After the measurements have thus been indicated on and by means of my improved measuring apparatus the device itself is applied to the cloth and used as a chart or pattern, so as to cut the garment in the desired shape and of the desired size.

Having thus described the invention, what is claimed as new is:

1. A device of the character described, comprising a frame embodying a base plate and front and rear beams, spring tapes secured to the respective beams and adapted to be sprung inwardly towards each other, arms mounted on said beams and adapted to press said tapes inwardly, and means for holding said arms at different positions with respect to the beams, both longitudinally and laterally considered.

2. A device of the character described, comprising a frame embodying a base plate and front and rear beams, spring tapes connected to said beams, means for pressing said tapes towards each other, each tape being provided with a longitudinal slot, and tape measures provided at one end with studs slidingly mounted in said slots.

3. A device of the character described, comprising a frame embodying a base plate and beams connected thereto, spring tapes connected to said beams, arms adapted to press said tapes inwardly, hooks formed on said arms, and a waist-belt adapted to be engaged by said hooks.

4. A device of the character described, comprising a frame embodying a base plate and front and rear beams connected thereto, hooked arms mounted upon the respective beams, and a waist belt adapted to be engaged by said hooks.

5. A device of the character described, comprising a frame embodying a base plate and front and rear beams connected thereto, and a spirit level pivotally mounted upon said base plate, the latter being provided with a scale with which the spirit level is adapted to coact.

6. A device of the character described, comprising a frame embodying a base plate and front and rear beams, and a spirit level having a longitudinally adjustable connection with said base plate.

7. In a device of the character described, a waist belt provided with a longitudinal slot, a stud mounted to slide in said slot, and a plumb line and weight suspended from said stud.

8. A device of the character described, comprising a frame embodying a base plate, a rear beam pivotally connected to said base plate, a foot piece having a sliding connection with the front end of the base plate, a front beam pivotally mounted on said foot piece, hooks adjustably mounted on the front and rear beams, and a waist belt adapted to be engaged by said hooks.

In testimony whereof I affix my signature in presence of two witnesses.

MICHAEL LO CELSO. [L. S.]

Witnesses:
MICHELE GRECO,
MARKE A. FOOTE.